United States Patent [19]

Dugger

[11] 4,324,607

[45] Apr. 13, 1982

[54] HOSE BUILDING MACHINE

[75] Inventor: Doyle Dugger, Muscatine, Iowa

[73] Assignee: Bandag Incorporated, Muscatine, Iowa

[21] Appl. No.: 137,972

[22] Filed: Apr. 7, 1980

Related U.S. Application Data

[63] Continuation of Ser. No. 909,183, May 24, 1978, abandoned.

[51] Int. Cl.³ .............................................. B65H 81/00
[52] U.S. Cl. .................................... 156/350; 156/143; 156/195; 156/171; 156/425; 156/446; 156/494
[58] Field of Search ......................... 156/184, 187–188, 156/195, 143–144, 425, 428–432, 446, 494, 171–173, 175; 242/2, 7.21, 155 R, 155 M

[56] References Cited

U.S. PATENT DOCUMENTS

| | | | |
|---|---|---|---|
| 1,876,760 | 9/1932 | Rosener | 156/425 |
| 2,624,527 | 1/1953 | Von Kohorn | 242/155 M |
| 3,345,229 | 10/1967 | Harpfer | 156/494 X |
| 3,438,831 | 4/1969 | Otstot | 156/446 X |
| 3,448,253 | 6/1969 | Bramblett et al. | 156/173 X |
| 3,476,327 | 11/1969 | Vawter | 242/7.21 X |
| 3,577,294 | 5/1971 | David | 156/173 |
| 3,616,078 | 10/1971 | Howard | 242/7.21 X |
| 3,679,508 | 7/1972 | Weidel | 156/173 |
| 4,145,740 | 3/1979 | McClean et al. | 156/175 X |

Primary Examiner—David A. Simmons
Attorney, Agent, or Firm—Cushman, Darby & Cushman

[57] ABSTRACT

A machine is shown for building a reenforced industrial hose for liquids and certain solids by wrapping a plurality of layers of different materials, including an uncured resin, on a rotating mandrel to form a laminated structure that may be cured in situ on the mandrel. The mandrel is rotated and a carriage moves alongside the mandrel to feed the several layers of materials forming the laminations onto the surface of the mandrel. The movement of the carriage is precisely coordinated with the rotation of the mandrel so that the edges of a resin or an uncured rubber strip and the steel wires forming the successive layers can be wrapped onto the mandrel, with the rubber strip material and the wires being laid on the mandrel in either a precise angle mode or an exact pitch mode. The pitch of the laydown of the strips of the successive rubber and the wire layers is controlled by regulating the movement of the carriage along a path parallel to the axis of the rotating mandrel and the machine is designed to automatically control these relative movements during the laydown of the layers during the constant angle mode of application by compensating for the changing diameter of the successive layers as the several laminations are built up to form the ultimate hose structure.

13 Claims, 23 Drawing Figures

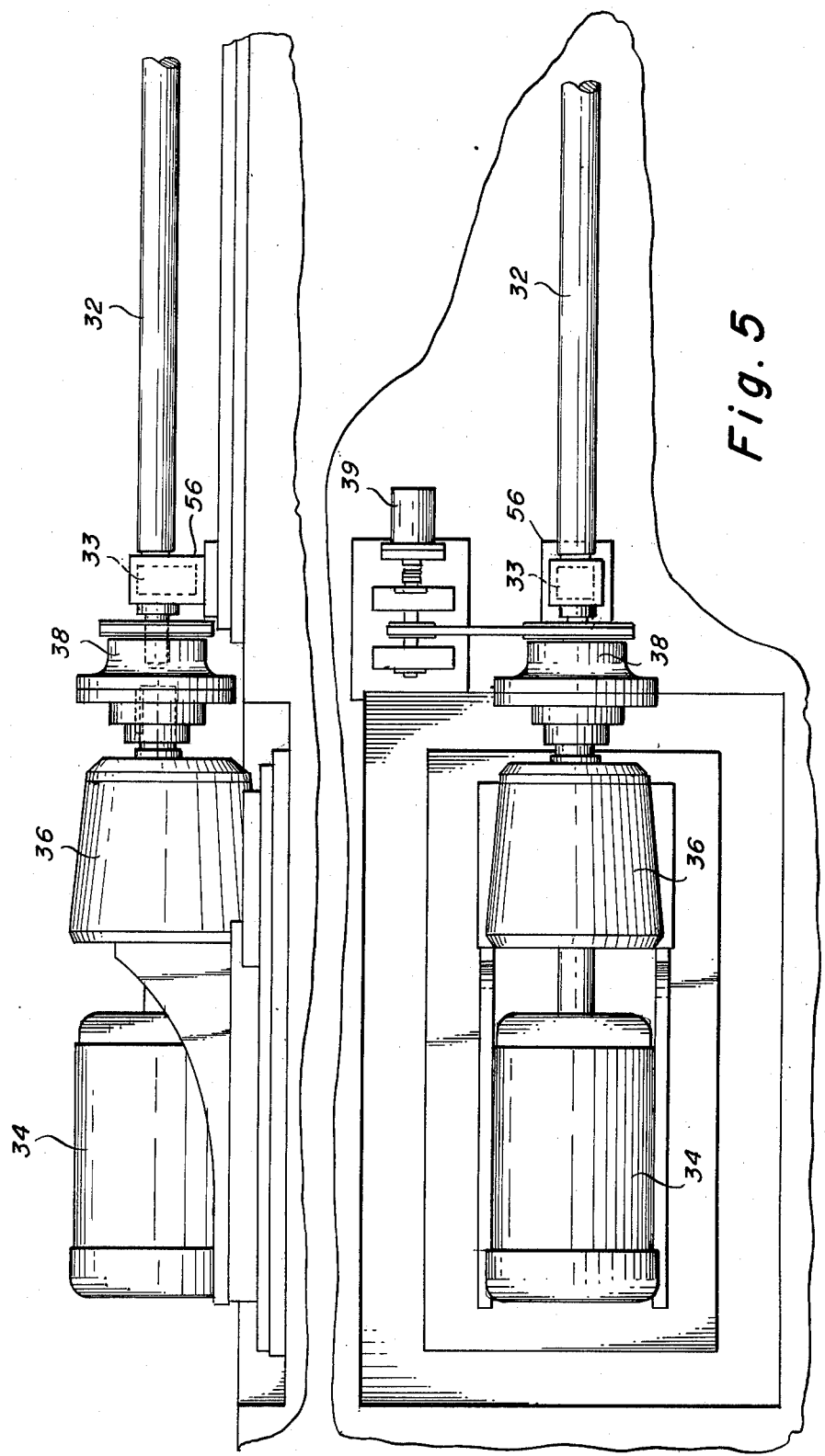

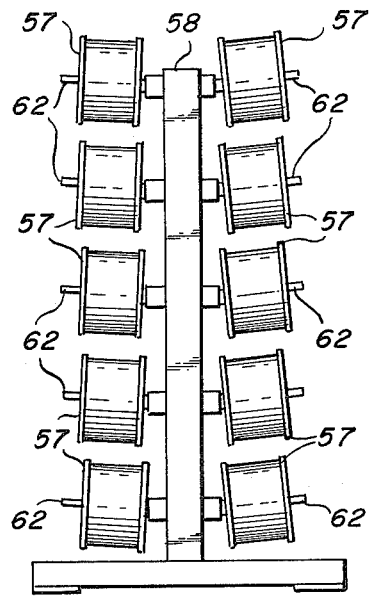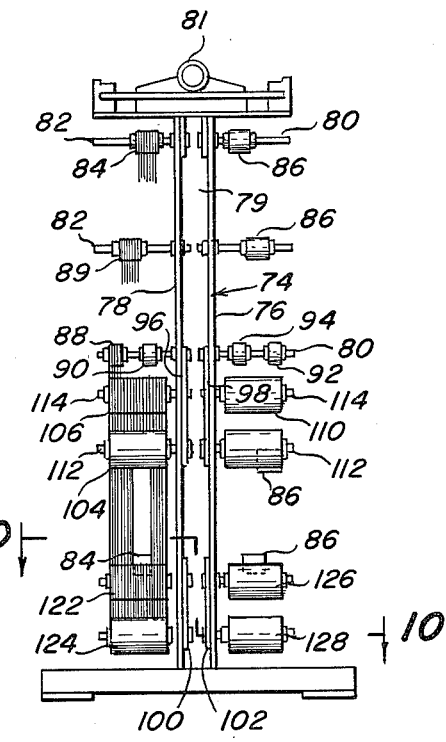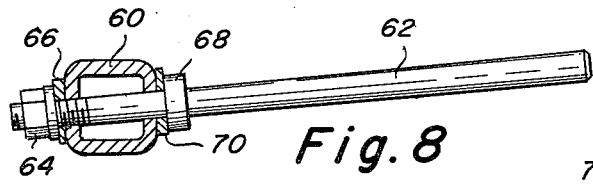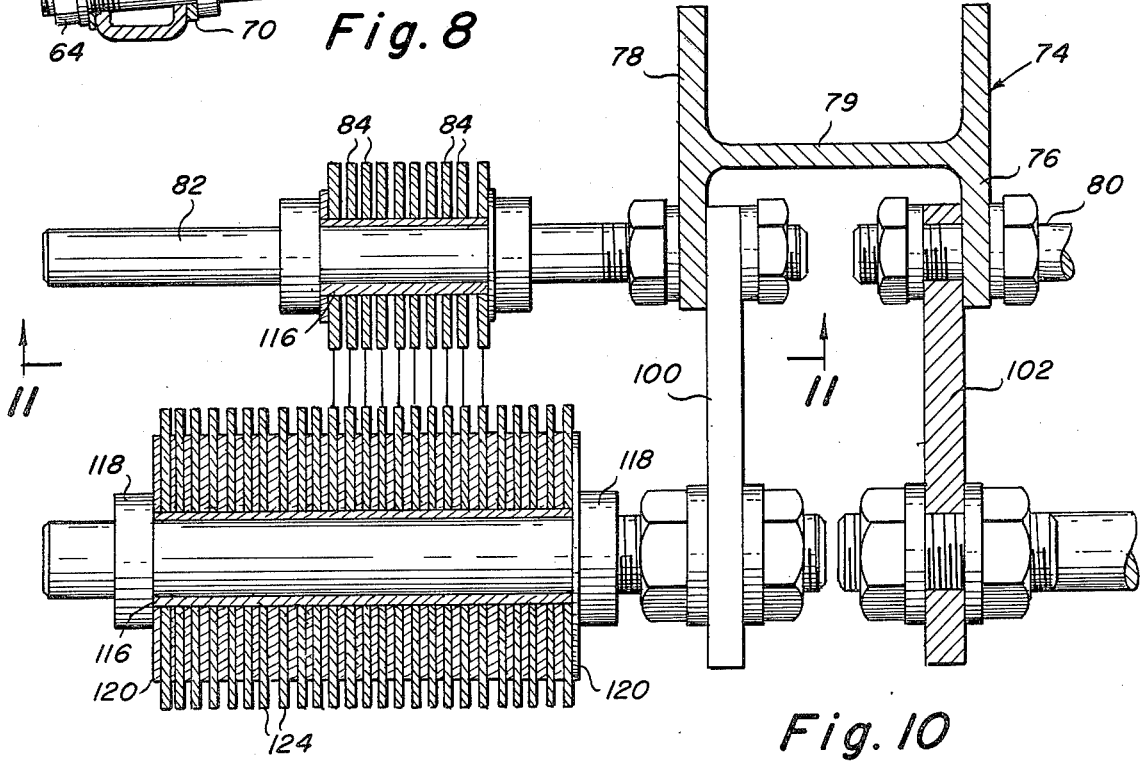
Fig. 7
Fig. 8
Fig. 9
Fig. 10

HOSE BUILDING MACHINE

This is a continuation of application Ser. No. 909,183, filed May 24, 1978, now abandoned.

BACKGROUND

Machines have been designed in the past for wrapping material in a spiral form around a mandrel wherein the speed of a carriage moving beside a rotating carriage and the speed of rotation of the mandrel are controlled relatively. A machine for feeding wire onto such a mandrel is shown in the U.S. Pat. No. 3,240,643 to Schroeder et al, Mar. 15, 1966. In this patented disclosure, however, the wire strands are not laid onto the surface of the covering material on the mandrel, the wire forms a body for supporting a coating of flexible insulating material that is fitted into a flexible outer casing to form an air duct. The resulting structure is a flexible pipe for use in an air conditioning system, the pipe being designed to easily bend around corners with the stretched apart coils of the support wire holding the insulation against the outer wall of the air pipe.

Another U.S. Pat. No. 3,401,073, to Wood, Oct. 10, 1968, shows a rotating mandrel and a carriage moving alongside the mandrel in a loosely adjustable but coordinated manner to apply a strip of fabric of more or less exact width spirally onto a core means supported on a mandrel to produce a fabric covered cylindrical element adapted to be mounted on a roller to form a roll applicator for paint. The movement of the carriage relative to the mandrel is made adjustable so that the slight variations in width of the strip may be compensated for so the wrapping can be made with the edges of the strip touching one another so there will be no gaps in the covering on the completed roller.

BRIEF DESCRIPTION OF THIS INVENTION

A laminated hose structure is built up on the machine shown herein and strips of rubber or rubberized fabric, that small hereinafter be included with the generic term "rubber" strip, and wire layers are wrapped in successive layers around a rotating mandrel. The rubber strips and wires are pulled from sources of supplies supported on a carriage that moves in a precisely controlled timed relation alongside of the rotating mandrel.

The motions of the mandrel and carriage means are monitored by a computer to form a precision machine wherein the bed of a large spring winding lathe can be used for supporting and driving the mandrel. Suitable head stock and tail stock means can be used to support chucks for carrying the opposite ends of the mandrels of various diameters. The mandrel is driven to rotate about its axis with a motor having sufficient power to pull the several materials being wrapped around its surface from supply means on the carriage. The carriage is driven by a separate motor under the control of a computer sensitive to the rotation of the mandrel, the carriage being made to move alongside the mandrel with a longitudinal speed precisely controlled relative to the speed of rotation of the mandrel whereby the material can be fed onto the mandrel with a precise control of either its pitch or at an exact angle even though the diameter of the composite structure on the mandrel increases with each layer that is applied.

The carriage is supported on tracks to move from end to end to its travel beside the mandrel and a suitable motor drives a screw means to rotate in exact relation to the speed of rotation of the mandrel so that regardless of changes in speed of rotation of the mandrel, the carriage speeds up and slows down in exact relation to the acceleration and deceleration of the rotation of the mandrel so that a precise laydown of the laminating layers can be made on the mandrel in either the pitch mode or angle mode of operation, regardless of changes in speed of rotation of the mandrel.

In this machine, the layers of a laminated rubber pipe reenforced with steel wire are wrapped onto the mandrel. First a layer of uncured rubber in strip form is wrapped spirally onto the entire length of the mandrel, then a layer of steel wire reenforcing is laid spirally onto the rubber with the wires being laid down in a closely parallel relationship over the surface of the rubber. A precision control of the wire wrapping operation is required to produce the desired wrapping of this reenforcing layer to cover the surface of the rubber layer, usually by making several passes of the carriage alongside the mandrel for laying the wires onto the rubber layer that has previously been wrapped onto the mandrel. The computer that controls the various operations of the machine is programed to index the wire laydown in a plurality of passes, each pass laying on a part of the entire wire layer and under the precision control exercised by the computer, each pass is laid on next to a previously applied pass with all of the wires in an exact parallel relationship, exact spacing between the centerline of each of the adjacent wires and at an exact angle or pitch relative to the longitudinal axis of the mandrel.

The sequences of the steps of first rubber wrapping and then wire wrapping are performed several times to build up a pipe made up of three, four or more of such composite layers. In some instances, the machine is used to apply an outer, spirally wound outer body wire to protect the surface of the hose when it is used in environments where the hose is dragged about.

When the laminated article has been completely laid up on the mandrel, the mandrel is removed from the machine and the rubber layers are cured in place on the mandrel. The finished article is then stripped from the mandrel and can be prepared for use for carrying liquids, concrete mixes and even some solids for industrial purposes.

It is therefore an object of this invention to provide a machine for the precision wrapping of wire onto a rubber layer on a mandrel to ultimately form a reenforced industrial hose.

Another object of the invention is to provide a machine that can be programed to lay multiple strands of wire precisely in position on a mandrel.

Another object of the invention is to provide a machine controlled by a computer programed to lay the several strands of wire onto the mandrel in precisely parallel relationship.

Another object of the invention is to provide such a machine that is programed to lay the wire strands on the mandrel either in a precise pitch mode or exact angle mode with respect to the longitudinal axis of the hose structure.

Another object of the invention is to provide a precision machine for wrapping wire on a rubber covered mandrel under tension to form a reenforced hose.

Another object of this invention is to provide a machine having a cooperating mandrel and carriage structure carrying strands of rubber and wire adapted to be laid precisely, either in a pitch mode or angle mode, onto the mandrel by coordinating the relative motions of the mandrel and carriage.

Another object of the invention is to provide a cooperating mandrel and carriage means having a wire let-off for feeding wire strands from storage means on the carriage onto the mandrel in a precise position.

These and other objects will appear more fully in the specification below.

IN THE DRAWINGS

FIG. 4 is a view looking along line 4—4 of FIG. 2;

FIG. 5 is a top plan view of FIG. 4;

FIG. 7 is a view along line 7—7 of FIG. 3;

FIG. 8 is a detail of a wire creel support shaft;

FIG. 9 is a view looking along line 9—9 of FIG. 3;

FIG. 10 is a sectional view along line 10—10 of FIG. 9;

DETAILED DESCRIPTION

Figure 23:
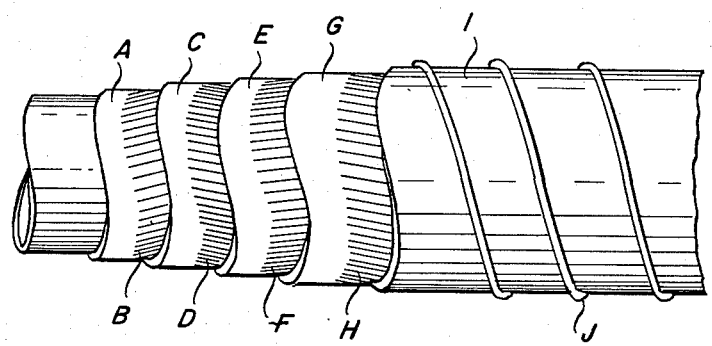
FIG. 23 is a view partly broken away showing a product such as may be made on this machine.

The hose structure for the manufacture of which this machine has been designed, is shown in FIG. 23. It is a laminated structure formed of alternate layers of rubber strips and wire reenforcing strands. The rubber strips are laid onto a mandrel support in a plurality of layers and the wire reenforcing strands are embedded in the body which is then cured in situ on the mandrel. The resulting hose body may then be stripped from the mandrel.

The several layers of rubber and wire reenforcing making up the hose shown in FIG. 23, can be wrapped on the mandrel in several ways. It is preferred to apply a first layer A of a rubber strip material on the mandrel by wrapping it spirally, for example, beginning at the right hand end of the mandrel and moving to the left. The first layer of wire reenforcing strands B may then be spirally wrapped around this rubber layer moving from left to right over the mandrel. A second layer rubber C can be laid on moving from left to right and the wire strands D can be wound over this layer moving from right to left. The alternate layers of rubber and wire strands EF, GH, etc. may be wrapped in alternating directions until the hose body is completed. Other wrapping patterns or numbers of layers can be easily made up on the machine of this invention.

Depending upon the use to which the hose is put, it may be desirable to wrap a protective body wire J around its outer periphery. This wire, too, may be wrapped onto the composite hose body prior to the curing step to form a completed integrated hose structure.

Figure 1:
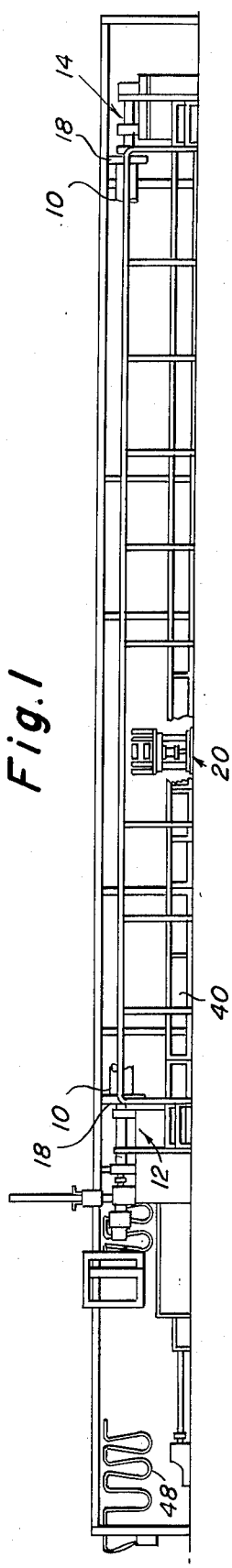
FIG. 1 is a front elevation of the machine with the mandrel of the machine partly broken away.
Figure 2:
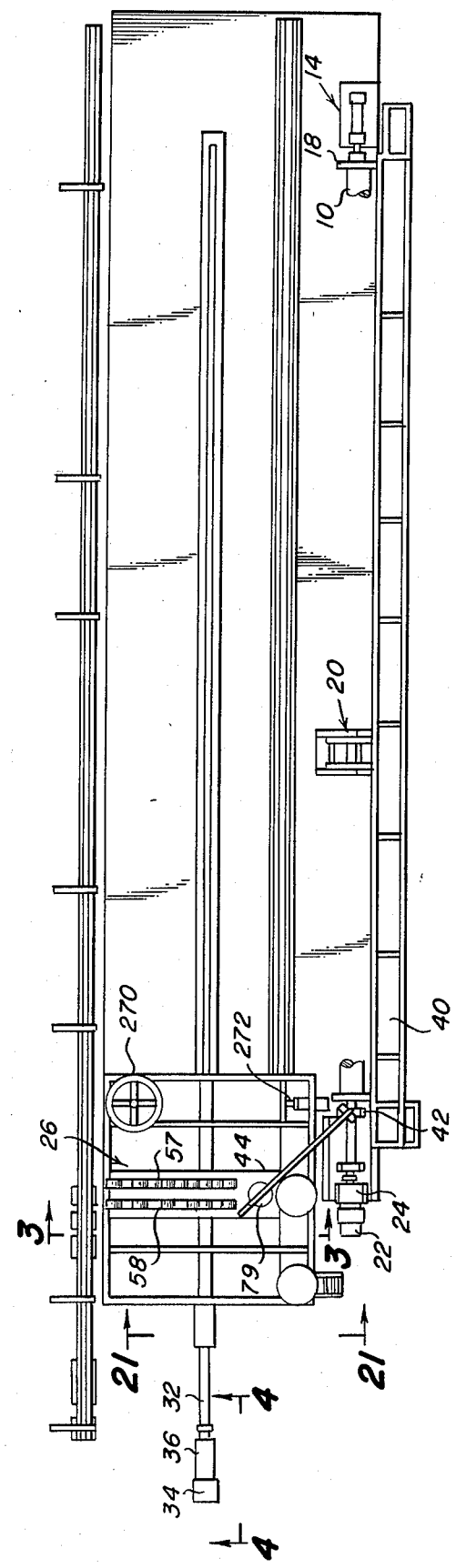
FIG. 2 is a top plan view of FIG. 1.
Figure 6:
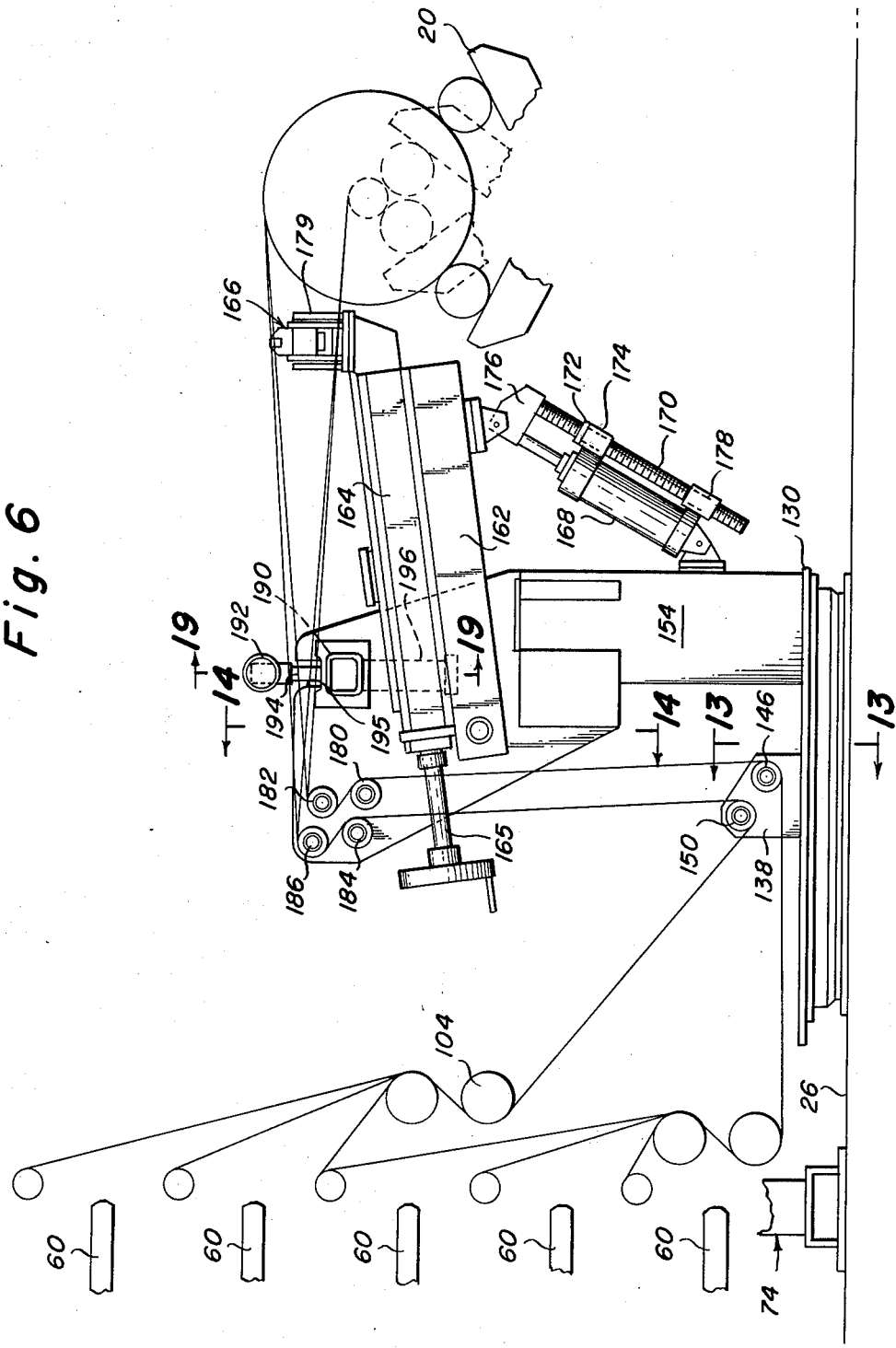
FIG. 6 is a sectional detail looking from the headstock toward the tailstock showing the wire wrapping operation.

The general assembly of the machine for producing the hose is best seen in FIGS. 1 and 2, wherein a mandrel 10, is supported between a head stock 12 and a tail stock 14 of a lathe bed. The head stock and tail stock are carried on suitable supports and are each provided with conventional three jaw chucks 18. A scissors type bearing support means 20 may be positioned under the middle of the mandrel to support it as shown in FIGS. 1 and 6. The drive means for rotating the mandrel is disposed at the head stock end and makes use of an electric motor 22, FIG. 2, connected to the head stock assembly through a speed reducer 24, all of which structure is a conventional arrangement such as might be used in a spring winding machine.

The mandrels used for making the laminated, wire reenforced, rubber pipe shown in FIG. 23, may vary in length and in diameter. The machine is designed to accomodate a wide variety of sizes of mandrels for making hoses in a wide range of sizes. Regardless of the size and weight of the hose material wrapped onto the mandrel, when the rotational speed of the mandrel is changed, the rotation is varied with a gradual acceleration or deceleration in order to minimize tracking and other inertial errors all under the control of the computer mechanism as will appear more fully below.

In order to produce the desired spiral wrapping of the several layers to form the hose, the rotating mandrel cooperates with a carriage means 26 supported on suitable rollers for riding along tracks 28 and 30 fixed in a position so that the carriage moves in a path parallel to the axis of mandrel 10. The carriage is driven longitudinally along its track in timed relation to the rotation of the mandrel by the rotatingly driven screw 32 and roll nut 33, best shown in FIGS. 4 and 5, by means of a reversible motor 34 driving through speed reducer 36 and a torque limiter 38. The motions of the carriage and rotating mandrel are coordinated through encoder 39, shown in FIG. 5, driven from the output of the gear reduction and torque limiter drive of the carriage, which encoder is connected to known computer mechanisms (not shown) to cause a precise longitudinal movement of the carriage with respect to each degree of rotation of the mandrel which is also connected to the computer. The hose building steps are preformed automatically in the machine under the complete control of the computer program that is teletyped into the system, but an operator standing on the catwalk 40 can monitor all phases of the steps of wrapping the layers of rubber, wire and a fabric or body wire on the mandrel. The operator also manually fixes the leading ends of the several strips and wires to the mandrel at the start of each such wrapping step.

To observe the machine, the operator walks along the catwalk built along the front side of the mandrel from where he can easily watch the laying on of the several layers of the laminations onto the mandrel and has at his fingertips a button control panel 42 supported at the end of a pivoting arm 44 carried on a suitable support 46 on the carriage. The support and control panel 42 moves with the carriage and yet the operator has the controls at his fingertips as he walks along the catwalk to observe the winding operations. The signal from the buttons on the control panel are transmitted to the computer controlled mechanisms through the looped conductor cable 48, shown in FIG. 1, the cable being adapted to be stretched from its closely hanging loops, there shown, as the carriage, the support 46, the pivoting arm 44 and the control panel 42 move from the head stock toward the tail stock.

Figure 3:
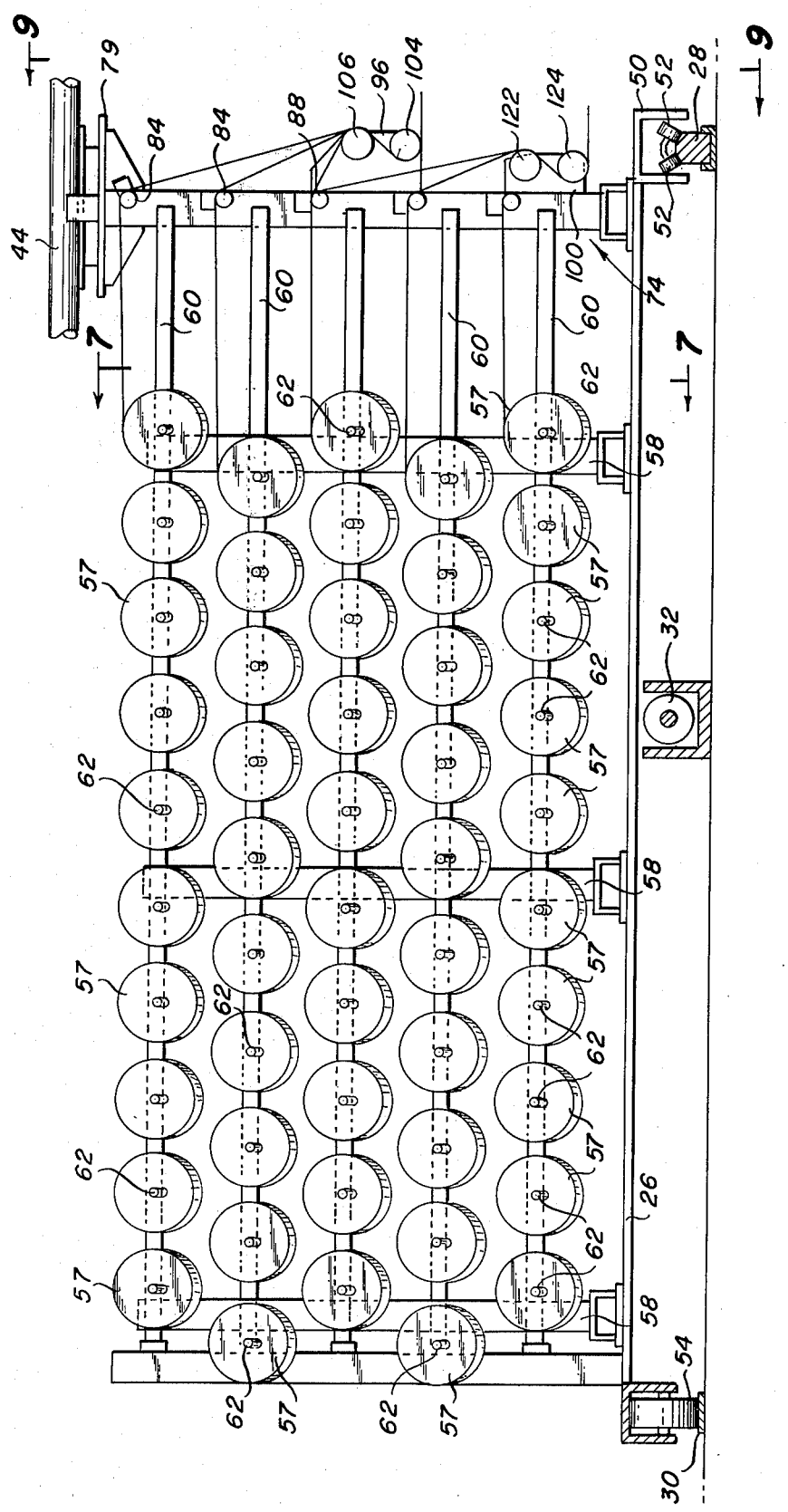
FIG. 3 is a view looking along line 3—3 of FIG. 2.

The carriage moves longitudinally beside the mandrel in a path parallel to the axis about which the mandrel rotates. As best seen in FIG. 3, the carriage 26 carries roller support means 50, fixed thereto, on its underside, for rotatably carrying the angularly disposed rollers 52 for engaging on the sloping sides of a track 28 to guide the carriage in a path alongside the mandrel. There are two rather widely spaced such roller support means 50 and rollers 42 on the left end and a similar tracking bearing means is also fixed to the underside on the right hand end of the carriage, as viewed in FIG. 2. The rearside of the carriage is supported by a pair of spaced apart rollers 54 that engage on the flat top of the rear track 30. The carriage is driven from one end of the machine to the other along the rotatably driven screw thread bar 32 that coacts with the roll nut 33 carried in housing 56 integral with the carriage, the longitudinal motion of the roll nut and the rotation of the mandrel being precisely coordinated by a computer tie-in (as will be described below) to effect the desired laydown of the several layers of the laminated hose.

The rubber strip material and a nylon or other fabric curing tape supply means are carried on carriage 26, as will appear more fully below. Also a plurality of wire strand supply creels are carried in means supported on carriage 26 for wrapping around the mandrel. As shown in FIGS. 2, 3 and 7, the wire strand supply creels 57 are mounted on means fixed to a plurality of vertically disposed supply stands 58 welded to the upper surface of the carriage. These strands each having a plurality of horizontally arranged carrying bars 60 welded thereto, the bars 60 forming supports for the plurality of upwardly tilted creel bearing shafts 62, shown in FIG. 8, each shaft being provided for freely rotatably supporting a creel that delivers an individual strand of wire adapted to be pulled from that creel to be laid onto the mandrel. The creel support shafts 62 are each carried in suitable apertures in bars 60 and are held fixed thereto by nut 64 that bears against the bevel washer 66 to draw the clamping collar 68 toward carrying bar 60 and against another bevel washer 70 to hold the creel shaft slightly tilted so that a wire creel 72 placed thereon, is held on each of the shafts by gravity as the wire is pulled from the creel. As shown herein, there are fifty creel shafts 62 disposed on each side of the support stands 58 so that up to one hundred individual strands of wire can be pulled from the wire supply on the carriage during a single wire wrapping step.

Near the front edge of the carriage, but spaced somewhat from the mandrel, as shown in FIGS. 3, 6, 7 and 19, there is another vertically disposed support stand 74 welded to the upper surface of the carriage, this stand taking the form of a vertically standing H-beam, as shown in crossection in FIG. 10, the side flanges 76 and 78 and the web 79 of the H-beam supporting an integral platform 81 at their upper ends.

The flange 76 of the H-shaped stand has a plurality of horizontally disposed idler shafts 80 bolted thereto, one spaced vertically about equally from the other and likewise flange 78 has a plurality of similar idler shafts 82 fixed to it in vertically spaced relation. The shafts 80 and 82 are carried on the support stand to position wire guide sheave means generally horizontally in line with the individual streams of wire strands drawn from the plurality of creels 57 supported at the different levels on vertically spaced shafts 60 on the carriage.

Figure 12:
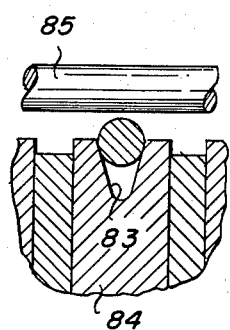
FIG. 12 is a sectional detail of a wire guide sheave.
Figure 11:
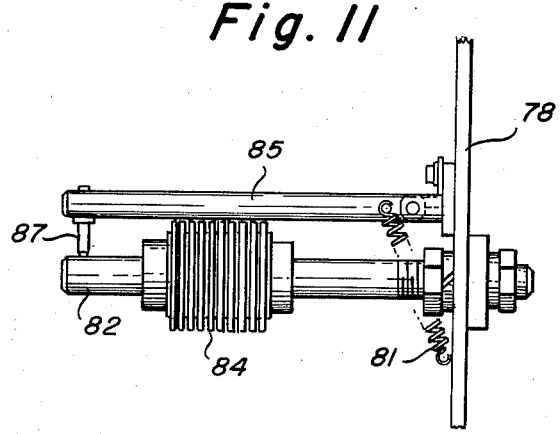
FIG. 11 is a detail view along line 10—10 of FIG. 10.

A plurality of individual sheaves 84 are carried on the idler shafts 82 on flange 78. On the uppermost bar 60 there are ten creels 57 on one side of the creel support rack and the ten strands of the wire pulled from these creels are engaged in the respective grooves 83, FIG. 12, cut in the peripheries of each of the ten sheaves 84 on the uppermost shaft 82 that serve to individually guide these wire strands toward the mandrel. As shown in FIG. 11, a keeper bar 85 is pivotally carried on flange 78 to fit closely over the wires to ensure that the individual strands of wire remain in the grooves of the sheaves and prevents the wires from coming out of the grooves in these sheaves 84 due to slack in the wire when the machine stops. A toggle spring 81 holds the keeper horizontally in place with an adjustable spacer 87 engaging against shaft 82. The keeper may be raised to allow the wire strands to be threaded onto the sheaves 84 but is lowered to the horizontal position while the machine is running. Each of the shafts 82 on flange 78 rotatably supports a similar set of sheaves 84 and keeper means 85 to guide the forty wires from the two uppermost and two lowermost shafts 60.

Similarly, the uppermost idler shaft 80 on flange 76 of support stand 74, carries a plurality of sheaves 86 having grooves therein, to guide the wire strands drawn from the creels 57 on the rack of creels on the other side of the support stands 58. These sheaves likewise each carries a keeper bar 85 pivotally mounted on flange 76 to hold their respective wire strands in sheaves 86.

The several rows of ten creels on the two uppermost and the two lowermost support bars 60 on each side of the creel support rack, are fed forwardly over the similar sets of ten sheaves 84 and 86 to deliver these respective sets of 10 wire strands forwardly. As shown in FIG. 9, the wires from the ten creels on the middle support bars 60 on each side of the support rack move forwardly over separated pairs of five sheaves each 88 and 90, and 92 and 94 to be divided and directed forwardly as described below.

Attached to flanges 76 and 78 are two pairs of mounting plates, upper mounting plates 96 and 98 and lower plates 100 and 102. The upper mounting plates on the opposite sides of support stand 74 carry the horizontally disposed sets of twenty-five grooved sheaves 104 and 106, and 108 and 110 respectively. These sets of twenty-five sheaves are supported on their horizontally disposed idler bearing shafts 112 and 114 supported on mounting plates 96 and 98 attached to flanges 78 and 76.

As shown in FIG. 3, the ten wire strands from the uppermost sheaves 84 are trained over the sheaves 106 and are looped back behind sheaves 104 as they are drawn onwardly toward the mandrel. The ten wires from the next lower set of sheaves 84 are similarly trained over the sheaves 106 and 104 along with the five wires from the middle set of sheaves 88. In all, a total of twenty-five wires are trained over sheaves 106 and 104 as the wires move from the creels to the mandrel.

The remaining five wires drawn from the creels on the middle support bar 60 are trained over the grooved sheaves 90 and pass downwardly and around the pair of grooved sheave assemblies 122 and 124 to pass on to the mandrel.

On the other side of the creel support rack 58, the individual strands of wires are drawn off in a similar pattern to be carried first over the upper two sets of sheaves 86 and the set of sheaves 92 to move over sheaves 110 and 108. The remaining wires on that side of the creel rack pass over sheaves 94 and the two lower sets of sheaves 86 to be carried over sheaves 126 and 128.

With this arrangement, as many as one hundred wire strands can be pulled from the two sets of fifty creels 57 each, supported on each side of the creel support means to be individually guided by the several sets of cooperating sheaves to be delivered toward the mandrel.

The various sets of sheaves 84, 86, 88, 90, 92, 94, 104, 106, 108, 110, 126 and 128, and the sheaves to be described below, are all identically supported on their respective idler shafts. As shown in FIG. 10, sheaves 124 are mounted on a bushing 116 for assembly on their respective support shafts. The sheaves are separated by thrust bearings 120 and are held confined between collars 118 to contain the thrust bearings and sheaves on the idler shaft with a slight degree of resistance to rotation which arrangement permits the individual grooved disks in their several groups of sheaves to turn against a slight retarding action to put tension on the individual strands of wires carried in the grooves on the sheaves which receive all of the strands of wire moving to the mandrel.

Figure 13:
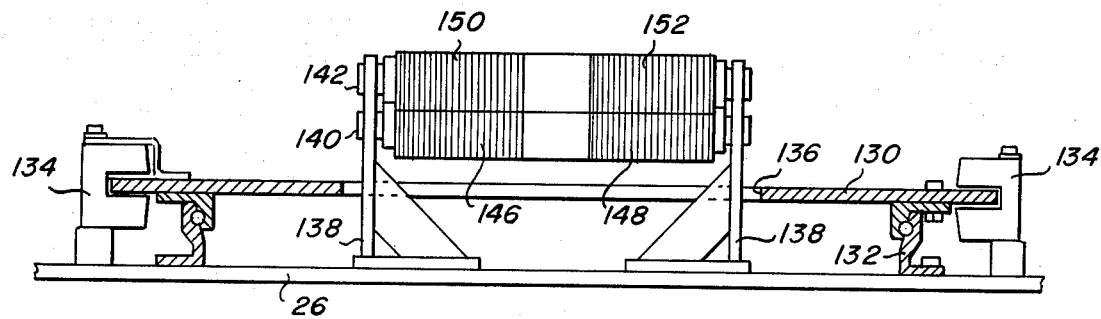
FIG. 13 is a view along line 13—13 of FIG. 6.

The one hundred or so strands leaving the sheaves 104, 106, 108, 110, 126 and 128 pass on to the further wire guide means which is shown in FIG. 6 and 13. This means includes adjustable elements to let the wire strands be pulled off of the wire creels and laid onto the mandrel at just the precise angle and tangential pull to lay the wires exactly in position around the periphery of the outer layer of material on the mandrel, as will appear more fully below.

To allow for proper adjustability in a plurality of directions, this further means is mounted on the front side of the carriage 26 and is welded to a rotating table 130, borne in a ball bearing support 132 integral with the front floor portion of the carriage 26. The table 130, as best seen in FIG. 13, is an annular element, the periphery of which is engaged by two disk brake means 134 supported on the floor of the carriage to engage the periphery of the table at spots spaced about 180° apart to hold the table stationary during each wire wrapping operation. The table has a central aperture 136 that surrounds a pair of shaft brackets 138 welded to the top of the floor of the carriage, the brackets 138 support shafts 140 and 142. These shafts support groups of twenty-five sheaves 146, 148, 150 and 152, to guide the 100 strands or less of wire onwardly.

Figure 14:
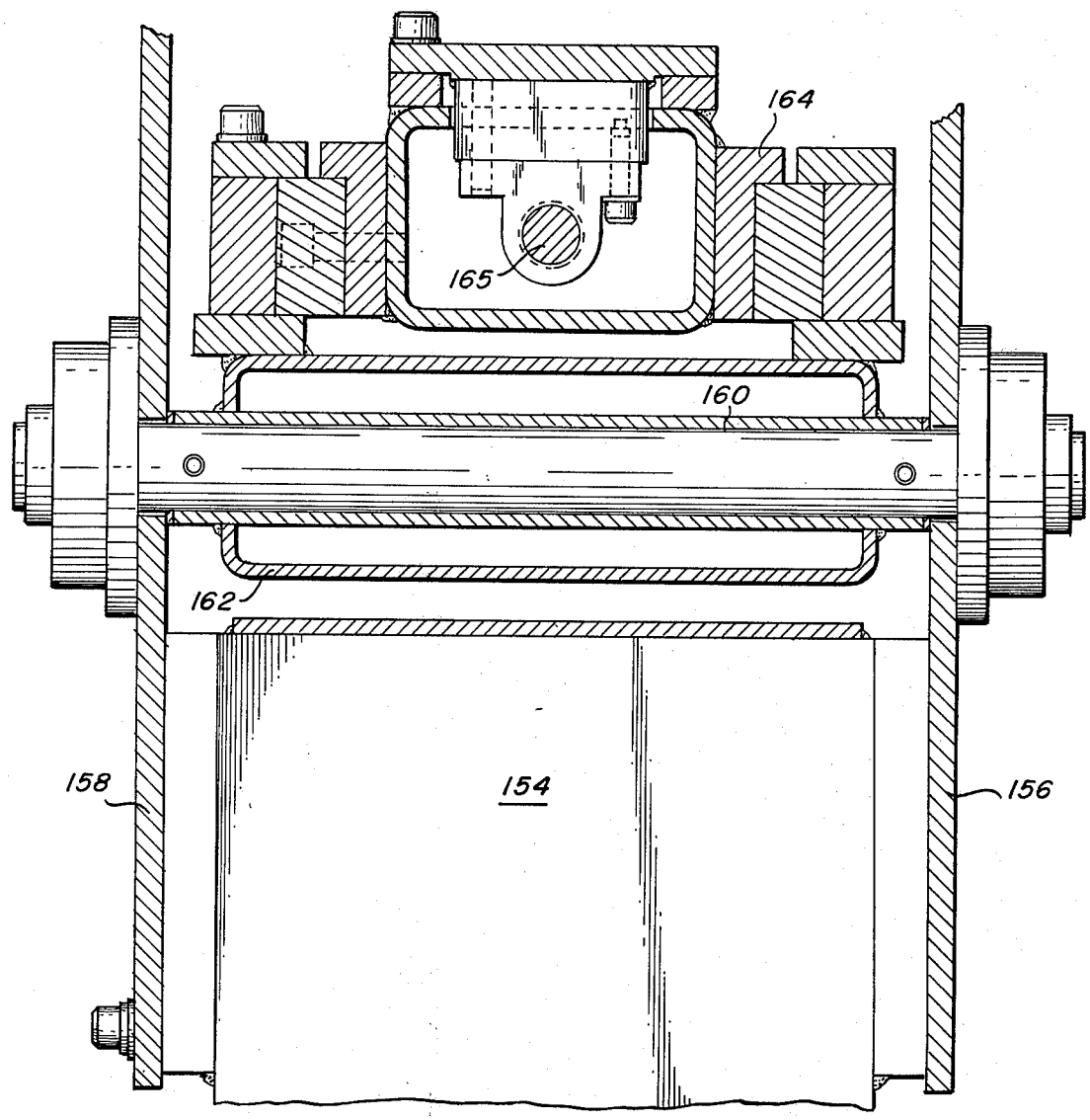
FIG. 14 is a view along line 14—14 of FIG. 6.

Referring to FIG. 6, the table 130 supports a vertically extending base post 154 that carries the wire adjustable letoff means that rotates with respect to the carriage 26 and the brackets 138 which remain stationary on the floor of the carriage to project through the aperture 136 to hold the sets of sheaves 146, 148, 150 and 152 above the top plane of table 130. As shown in FIGS. 6 and 14, at its upper end, the post 154 supports integral vertically disposed planar slide support plates 156 and 158, one on each side of the post, which plates support the horizontal pivot shaft 160. The pivot shaft carries a slide base 162 that supports a carrier 164 slidably therein that has integral wire strands guide means 166 situated at the outermost upper end of carrier 164.

The slide base 162 is adjustable about pivot shaft 160 and an air cylinder motor 168 is pivotally mounted at one end on post 154 and the piston shaft is pivotally mounted on the underside of the slide base 162. This motor 168 may be used to adjust the angular position of carrier 164 relative to the post 154 to adjust the vertical height of the means for feeding the wire strands onto mandrels of different diameters as shown in the full lines and dotted lines of the scissor support 20 in FIG. 6. The motor 168 is also activated by the computer controls, so that the slide base is lifted to raise the carrier 164 so that it will pass over the head stock or tail stock as the carriage reaches the end of its travel in either direction. When the carriage returns to a normal run position alongside the mandrel, the wire guide is lowered when the air motor is operated to return the wire guide to its normal position as shown, and the stop screw 170, having a collar 172 adjustably positioned along its length, engages on a slide bearing that also serves as a stop 174. The stop screw is connected to a bracket 176 integral with the piston rod of the air motor and slides in a path alongside the motor in bearings 174 and 178. This adjustment is used to also make precision positioning of the wire guide possible as the diameter of the laminations build up on the mandrel, all under the control of the computer.

The carrier 164 is adjustably moved longitudinally along the slide base 162 by hand wheel 163 keyed to the screw thread drive means 165 to position the wire guide means 166 on the desired proximity of the periphery of the mandrel during the wire wrapping operation.

As mentioned, the setting of the angle of the slide base is determined by the setting of collar 172 on the stop screw 170 and the wire guide may be further set in a proper position by a control relative rotation of the support 154 with respect to the base 130. This adjustability provides wire let-off means having a multiplicity of settings for the positioning of the ultimate wire guide 166 adjacent the respective peripheries of the mandrels of different diameters that may be used whereby to position the guide 166 to let the wires flow onto the mandrel tangentially as best shown in FIG. 6.

Figure 15:
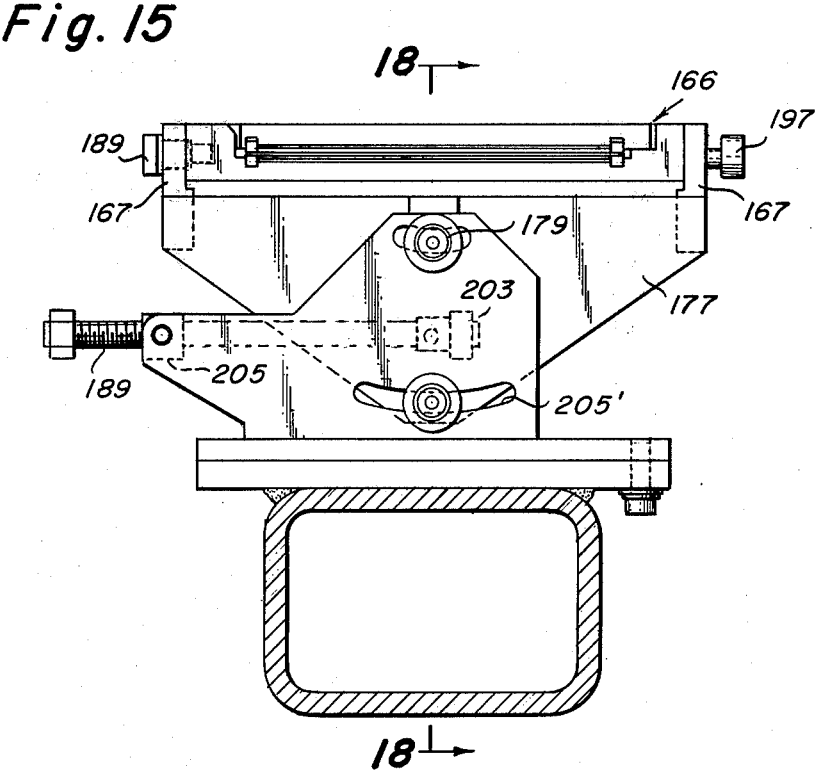
FIG. 15 is a view looking at the wire guide assembly from the rear side of the machine.
Figure 16:
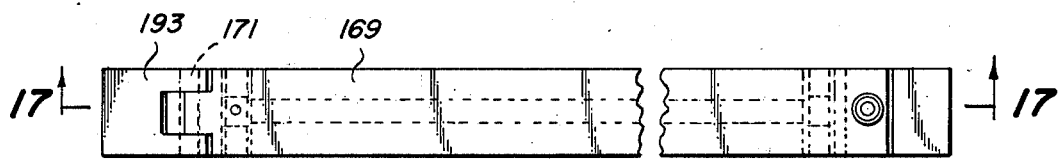
FIG. 16 is a top plan view of the wire guide element.
Figure 17:
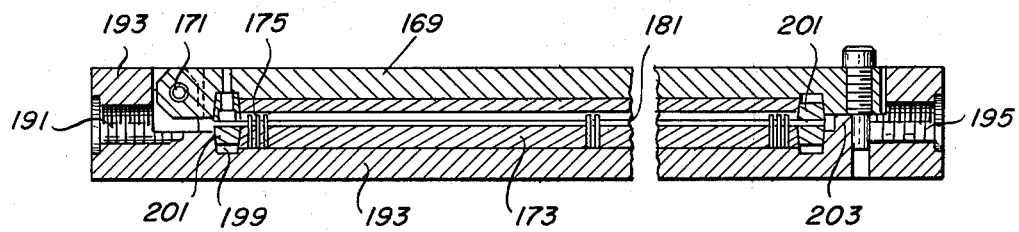
FIG. 17 is a sectional view along line 17—17 of FIG. 16.

Referring to FIGS. 15, 16 and 17, the guide 166 is shown to be removably attached with a shoulder screw 189 to frame 177, having the upright arms 167 on the opposite sides thereof, the inner end of the screw engaging in a socket 191 bored in the end of the body 193 of guide 166. The opposite end of the body has a socket 195 that cooperates with another shoulder screw 197 to rigidly fix the body 193 in frame 167 when the shoulder screws are driven home. The guide body 193 has a recess 199 cut lengthwise along its upper surface to receive the wire guide insert 173. Suitable wedge-shaped clamp means 201 can be provided to hold the insert fixed in the recess and the insert has a plurality of vertically extending closely spaced spiral pins 175 seated in a comb-like manner in its upper surface. A cover 169 is hinged to the insert 193 to be raised and lowered about the axis 171 to be folded over the protruding ends of pins 175, the bottom edge of the cover 169 being held spaced somewhat from the upper surface of the insert by a shoulder 203 against which the cover is held seated by a suitable cap screw. The cover has a slot 181 extending lengthwise along its bottom surface, the slot having a width to loosely fit over the uppermost ends of pins 175 to form an enclosed space defined by the side edges of the pins, the top edge of insert 173 and the bottom edges of cover 169 on both sides of slot 181. These respective apertures between the pins each cooperate with a single strand of wire being pulled from the wire let-off through guide 166 to precisely control the direction of movement of the wire on its way to the mandrel.

The wire guide 166 is made to be replaceable so that wires of different diameters may be threaded through the wire let-off. While the sheaves are designed to accept wire strands having a wide variation of diameters that all can be fitted into the V-shaped grooves on their peripheries, the individual guide 166 are each designed to have a neat fit in order to cooperate with wire strands having different diameters to maintain the precision laydown of the plurality of wire strands in an exact side by side near touching relationship onto the periphery of the mandrel.

Figure 18:
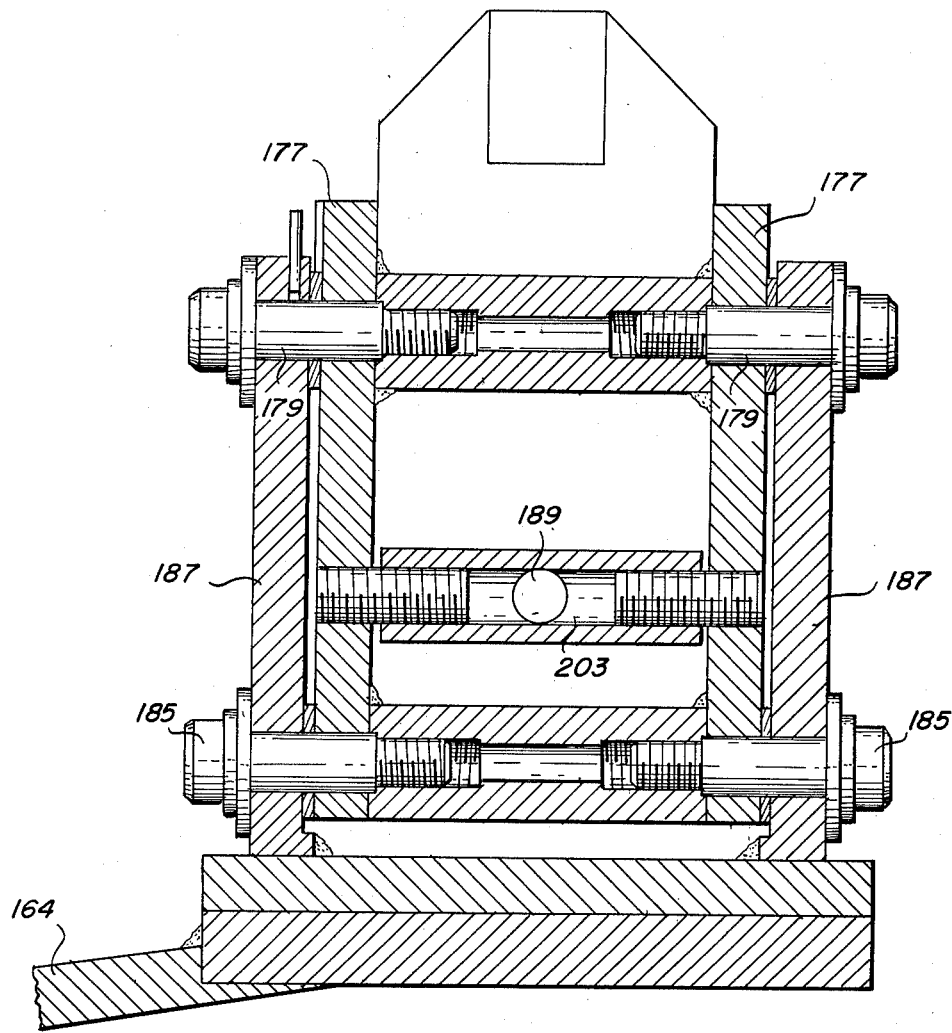
FIG. 18 is a sectional view along line 18—18 of FIG. 15.

The bracket or frame 177, shown in FIG. 15, for supporting guide 166 is, as best seen in FIG. 18, pivotally mounted on aligned pins 179 between the generally vertically disposed spaced walls 187 welded to the end of carrier 164, to rock about the axis of the pins as the adjusting screw 189 is turned. The bracket 177 can be tilted as much as 15° on either side of a vertical centerline that intersects the horizontal axis of pins 179. The adjusting screw is rotatably engaged near one end in a pivotally mounted bearing means 203 and the other end being threaded through a rotatably mounted nut 205. The nut means and bearing means are fixed one to the walls 187 and the other to bracket 177 so that rotation of screw 187 turns the bracket about the axis of pins 179. The bracket is held in its adjusted position by means of shoulder screws 185 that are carried in the bracket and occilate in slots 205 as the bracket is adjusted. The shoulder screws are tightened to lock the bracket 177 to walls 187.

The bracket 177 and wire guide 166 supported therein, is made adjustable to ensure the precise laydown of the multiple wire strands being laid onto the mandrel. The various adjustments provided on the wire let-off, including table 130, the elevation of slide base 162, carrier 164 and wire guide 166, provide a structure having a universal adjustability.

The wire strands being pulled from the wire creel stand structure, are guided from sheaves 104, 108 to pass around the sheaves 150 and 152, as shown in FIGS. 3, 6 and 13, while the wire strands from sheaves 124 and 128 are guided around sheaves 146 and 148, respectively, all of which sheaves 146, 148, 150 and 152 are carried on shafts carried by brackets 138, centered in aperture 136 in table 130, as described above. The sheaves 150 and 152 are positioned slightly behind and above sheaves 146 and 148 and the wire strands pass around these sheaves to move upwardly to additional sheave means rotatably supported by the let-off slide carrying plates 156 and 158. The wires from sheaves 146 and 148 pass upwardly to two rows of vertically spaced sheaves 180 and 182. These sheaves are positioned one above the other to bend the wires backwardly before they move forwardly to wire guide 166 and similarly sheaves 184 and 186 take the wires from sheaves 150 and 152 to bend these, the wire strands, slightly as these wires move on to guide means 166.

Figures 19, 20:
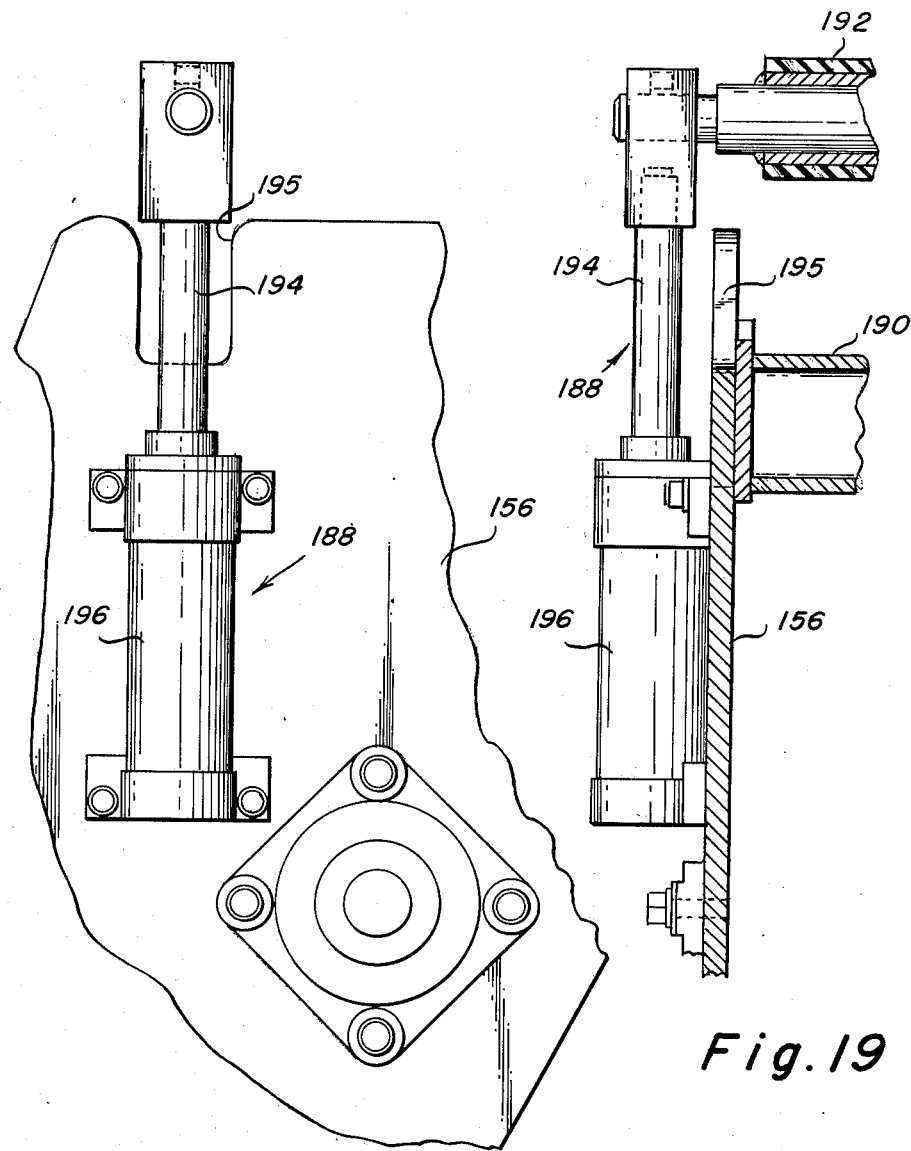
FIG. 19 is a sectional view along line 19—19 of FIG. 6.
FIG. 20 is an enlarged side view of the clamp shown in FIG. 19.

Fixedly carried on the slide support plates 156 and 158 to extend across the path of the wires moving from sheaves 180, 182, 184 and 186 to guide 166, is a wire clamp means 188, shown in FIGS. 6, 19 and 20. The clamp means includes an anvil 190 positioned under the wires and a rubber clamp roller 192 for cooperating with the anvil. The roller 192 is supported at its opposite end on the ends of piston rods 194 of the air motors 196 mounted on the outside of each of the slide support plates 156 and 158. The slide plates are cut away to provide notches 195, one in each plate, to permit the roller 192 to be pulled down to engage the wires tightly against the anvil 190 to hold the wires taut that are threaded through the various sets of sheaves in the wire let-off, to prevent the wires from becoming slack and falling out of their sheaves between wire wrapping steps when the ends are unattached, such as while the rubber wrapping cycle proceeds.

As soon as a new layer of rubber has been wrapped on the mandrel, the free ends of the wires may be attached to that layer at one end of the mandrel and the wire wrapping operation can proceed. The clamp is then released after the wire ends are fixed to the mandrel by tying the ends down with a piece of tacky uncured automobile tire fabric which adheres to the uncured rubber on the mandrel. The wires are pulled taut and stuck to the rubber to produce a tension in the order of a five pound pull on each wire. The tension is continued throughout the wire wrapping operation by the pulling effect exerted by rotating the mandrel which pulls the wire strands from their creels over the various sheaves. The pulling tension plus the working of the wires by bending them back and forth through the path established through the sheaves serves to properly tension and condition the wire strands for the precision laydown needed for the present purposes.

Figure 21:
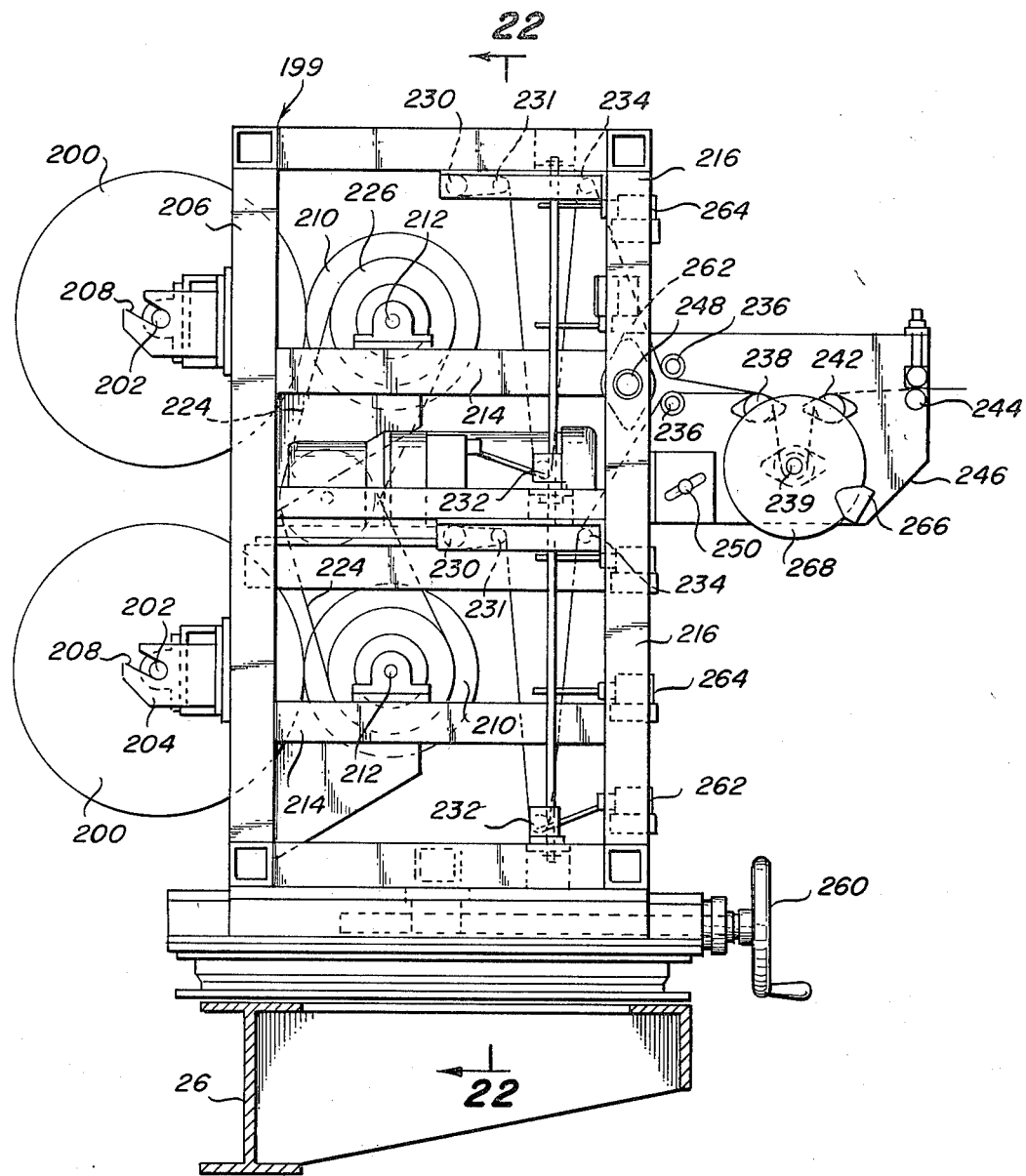
FIG. 21 is a view along line 21—21 of FIG. 2.
Figure 22:
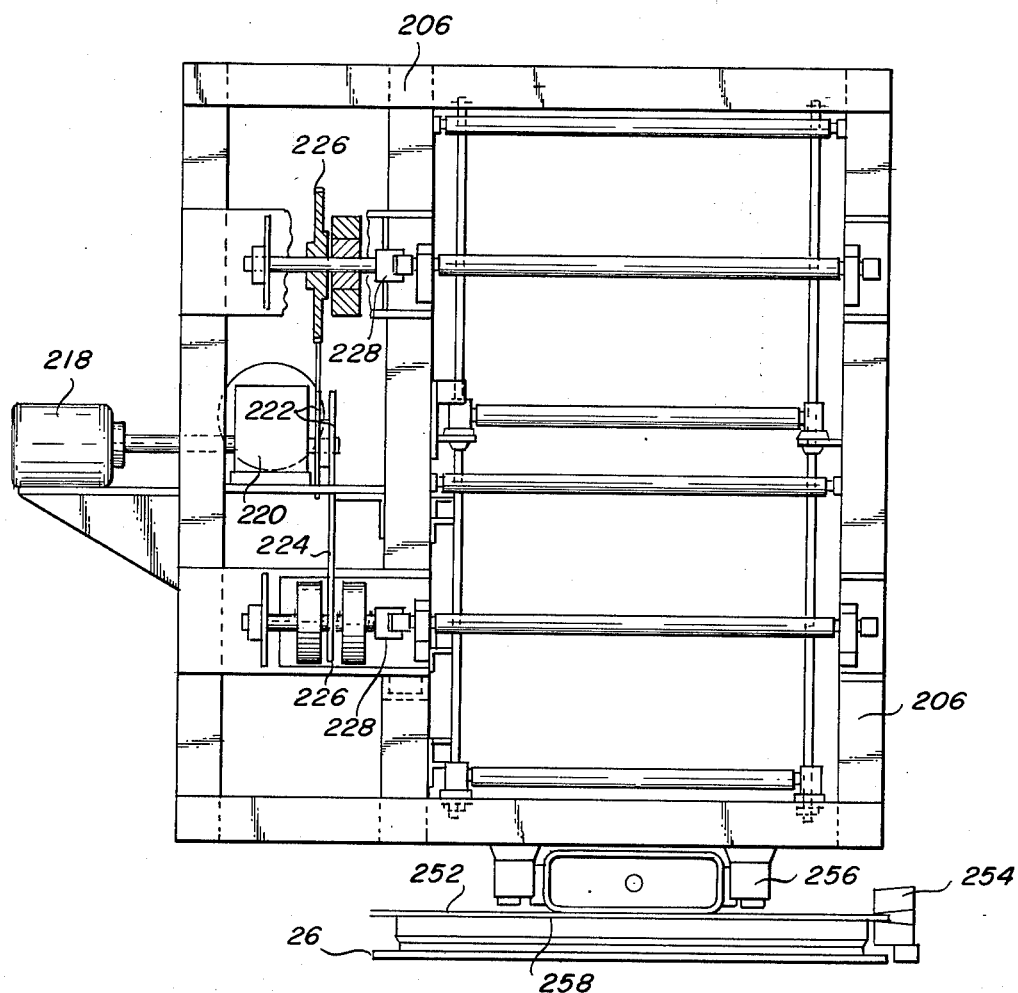
FIG. 22 is a view along line 22—22 of FIG. 21.

In addition to providing a moving support for the creels for supplying the wire strands for the wire layers, the carriage also has a frame means 199 mounted thereon that provides a supply of rubber strip material and means for supplying and tensioning the nylon cure tape wrapped onto the material on the mandrel as the last layer. As seen in FIGS. 21 and 22, the rubber strips are pulled from the supply reels 200, carried on shafts 202. These shafts are removably supported in brackets 204 integral with the vertical supports 206 carried in a frame mounted on the top of carriage 26. The brackets have upwardly directed slots 208 formed therein to permit the quick mounting of shafts 202 in their supports so that the reels 200 can be placed on the carriage to be rotatably supported on the shafts.

In order to pull the rubber strips from their reels so they can be fed to the mandrel, there are two driven feed rolls 210 with one disposed respectively in front of each of the rubber strip supply reels 200. The feed rolls are supported in bearings 212 carried on cross bars 214, which in turn, are supported between vertical supports 206 and 216. The feed rolls are driven to rotate by an electric motor 218 that drives a speed reducer 220 that, in turn, drives sprocket wheels 222, carried on the drive shaft, from the speed reducer. The sprocket wheels drive chains 224, that drive sprocket wheels 226, that are keyed to drive shafts 228 on which feed rolls 210 are keyed.

First one and then the other of the feed rolls 210 is used to pull the rubber strips from the upper or lower one of the supply rolls 200 and the rubber strip being delivered forwardly is first guided around the underside of its respective feed roll 210 and is led upwardly over its guide roll 230 from which the strips flow over roller 231 to then turn downwardly around dancer roll 232 to turn around 180° and up to roll 234. The rubber strip is then pulled over roller 236 and is drawn over rollers 238, 239 and 242 to be delivered between guide rollers 244 to pass onto the mandrel. The operator presses the free end of the rubber strip onto the mandrel and because of its tacky characteristic, it firmly adheres to this surface. The rollers 238, 239, 242 and 244 are all carried on the bearing support 246, which in turn is supported on vertical support 216 carried on bearing 248, the position of the bearing support being fixed by bolting it to fixed plate 250 integral with support 216. The support 246 may be raised and lowered as needed to position the guide rollers adjacent the mandrel to feed the rubber strip material tangentially onto the mandrel.

To provide further adjustment in the rubber strip supply means, the support frame 199 for carrying the rubber strip material or nylon strip supply is mounted on carriage 26 on a turntable 252 that is held fixed in an adjusted position by caliper brake means 254. The frame, in turn, is adjustably mounted for sliding movement from front to back on the top of the turntable in a track 256 integral with the turntable. The track supports the slide 258 and the frame is adjusted along the track by means of the screw drive that coacts between the track and slide under the control of hand wheel 260. Such rotational adjustment is used to move the delivery end of the rubber or nylon strip supply means into a proper position to lay them onto the mandrel at the proper angle of approach by adjustment of turntable 252. In order to accomodate mandrels of different diameter and also to adjust quide rolls 244 away from the mandrel as its diameter builds up, the longitudinal adjustment of the support frame 199 to move guide rollers 244 toward or away from the mandrel, is accomplished by driving hand wheel 260 and sliding the frame along tracks 256.

The rubber strip is fed from one supply roll, for example the bottom roll 200, until that supply is used up and then the machine is stopped while the operator threads the rubber strip from the other supply roll 200 around its feed roller 210, guide rollers 230 and 231 and around the dancer roll 232 to be delivered on to guide rolls 244. The dancer rollers 232 for each rubber strip feed cooperates with a pair of vertically spaced apart limit switches 262 and 264. When the strip is being threaded through its path to the mandrel, the lower switch 262 is intermittently raised to cause motor 218 to be energized to slowly feed the strip forwardly. After the rubber strip has been led onto the mandrel and the hose making machine is started, the mandrel pulls the rubber strip through the guide rolls against the tension produced by a caliper brake 266 that engages against the sides of a disk 268 keyed to the axle to which roller 239 is keyed. The action of the brake is continuously monitored to produce the desired tension in the rubber strip being delivered onto the mandrel. As the mandrel wrapping proceeds, the respective dancer roller 232 that is active, moves between its limit switches 262 and 264. Switch 264 causes motor 218 to drive the feed wheels 210 at a desired slow rpm but if the mandrel should pull more of the strip from guide rolls 244 than is being fed from supply roll 200, the dancer roller 232 will be raised to engage limit switch 264 that is connected to motor 218 through means that cause the motor to speed up the drive to feed roll 210. As the speed picks up, more rubber strip is fed through the dancer roller 232 than passes through guide rolls 244 so that the dancer roll slowly drops down to deactivate limit switch 264 and return the motor drive to feed rolls 210 to the slower speed under the control of limit switch 262. If the mandrel stops, the dancer roll 232 falls still farther to engage switch 262 and when this limit switch is depressed, the motor 218 is deenergized.

At the end of the rubber strip and wire strands wrapping operations, a strip of nylon or other fabric can be supplied from a roll carried in support brackets 204, to be fed through the dancer roll and guide roll means to be properly tensioned and wrapped around the structure built up on the mandrel to be temporarily used as a cover while the rubber fabric is being cured. The nylon or outer protective layer can be removed from the finished hose after the cure.

For some uses, as shown in FIG. 23, hoses made in this manner can be protected against wear by wrapping a heavier body wire J spirally around its periphery. Usually such a body wire is supplied from a suitable wire reel 270 supported on carriage 26 to be fed to the mandrel through a wire let-off 272.

OPERATION

The machine described above is designed to control the winding operation in either a pitch mode or angle mode. An exact rotational movement of the mandrel relative to the longitudinal movement of the carriage is provided for under the control of the computer arrangement. In the pitch mode, the rubber strip material and the wire plies are all laid onto the outer surface of the mandrel with the edges of the strips of rubber in touching relation and the wires in parallel relation with the precise pitch specified in the instructions of the computer program. When the angle mode of operation is specified, the pitch varies as the diameter increases so that it is necessary to adjust the angle of laydown as each layer of the rubber strip material and wire plies are wound onto the mandrel.

In the pitch mode, it is possible to track wire by wire, rubber strip by rubber strip and nylon tape by nylon tape in edge to edge relation within a given layer, and also the outer body wire can be tracked with the wire ply layer. The pitch mode adjusts for the fact that the angle of the wire on the outermost diameter of each ply is slightly different than the angle of the wire ply below. This is also true for the rubber strip.

In the angle mode, the relationship is expressed by the formula:

$$(\tan \theta)_k = (\Delta D \pi / \Delta L)$$

where $\Delta L$ is the change in lead, $\Delta D$ is the change in diameter and $(\tan \theta)_k$ is a constant angle.

The formula for the pitch mode is:

$$l_k = (\Delta D \pi / \Delta \tan \theta)$$

where $l_k$ is a constant lead, $\Delta D$ is the change in diameter and $\Delta \tan \theta$ is the change in angle.

The computer program is made up using either one or the other of the angle mode or pitch mode formulas depending upon whether the angle mode or pitch mode is accepted. The above described machine with such a computer means associated with the various elements can be placed under the supervision of an operator who can follow the action of the machine from the catwalk 40. As the successive operations proceed under his direction, by manipulation of the various controls at his fingertips on control panel 42, the various computer controlled procedures are performed in accordance with the programmed instructions fed into a conventional computer and its peripheral mechanisms. The operator can control the speed of the activities and stop the machine at any time if need be to perform the manual operations required to condition the machine for the various wrapping steps, however, the actual drive system for coordinating the spiral wrapping activities are computer-controlled by a system that locks the electrically powered mandrel and carriage drives together in a predetermined ratio so as to maintain an exact pitch or angular wrapping relationship in effect as the wire is wrapped on the mandrel and the machine goes through its starting and stopping procedures without any accumulation of error. The computer controls and the mechanisms activated by these controls are arranged to produce a predetermined phase shift or degree of revolution of the mandrel relative to the carriage at each successive wire wrapping step and return the carriage and its wire let-off means to the exact starting point for beginning each wrapping step for laying on the materials of each layer in each lamination. The machine can be directed to return to the home position at anytime, if, for example, the electrical power should be lost in the computer or for any other cause which might otherwise permit the encoder and carriage to get out of synchronization with respect to the mandrel. By including a home position for all of the moving parts of the machine under the control of a "Zero" set button, it is possible to resynchronize the carriage and mandrel by returning the carriage to the head stock while the position of the mandrel is returned to the home position so that the precision hose manufacturing process can be resumed after establishing the correctly coordinated positions of the mandrel and carriage.

All of the switches for energizing the various electrical circuits for activating the various functions under the control of the computer are centered in the operator-control panel 42 which has a Manual/Automatic selector switch. At the beginning of a hose building operation, the mandrel 10 and carriage 26 are moved to the "Home" or starting position by selecting the Manual setting so that, if necessary, the carriage and mandrel can be gently jogged into their respective starting positions. These jogging activities are performed under the control of the computer so that exact movements of these respective parts of the machine can be anticipated whenever one or both of the mandrel or carriage jog switches are activated to move such elements backwardly or forwardly or one relative to the other, to set the macine properly in the "Home" position.

Then the Automatic selection can be made on the Manual/ Automatic selector switch to cause the computer system to check (1) the validity of the teletype entry to the computer, (2) whether both the carriage and mandrel can be started properly, (3) whether the carriage can complete the length of travel entered in each direction by the teletype program, and (4) when a multiple pass run is to be made, whether the carriage is at the proper starting point position. When all of the above conditions are cleared through the computer, automatic operation can proceed.

At the beginning of a days operation, it is usual to press the "Home" or "Zero set" button on the control panel 42 to establish the proper initial synchronization of the mandrel and carriage at the head stock end 12 of the machine where the carriage will hit a "Home" limit switch. At this time, the carriage will have established its precise position in synchronization with respect to the mandrel, and hose manufacturing can proceed as scheduled. Suitable light signaling means may be provided on the control panel to indicate when the machine is in condition to start a building cycle.

When the system has been checked out and the positions of the mandrel and carriage have been precisely coordinated, after an appropriate program has been entered in the computer, such as by a teletype message, the Manual/Automatic selector switch may be turned to the Manual side and the carriage can be moved to the starting position. Should the operator note any misalignment of any of the positioning of the parts, a "Forward" motion switch can be used to jog the carriage into place with incremental steps under the computer control. If necessary, a "Reverse" buttom can be pressed to jog the carriage in the opposite direction. Likewise, the mandrel can be jogged with the "Mandrel" button on the control panel to precisely adjust the rotated position of the mandrel at the start of the operations. When the carriage and mandrel have been set in their starting positions, the Manual/Automatic selector switch may again be switched to Automatic so that these relative positions of the mandrel and carriage are locked into the computer for the completion of the particular hose building program put into the computer. This program in the computer will remain in control of the machine's cycles of operations until the Manual-/Automatic selector switch is moved from Automatic back to Manual.

After a program has been entered in the computer and the Automatic operation has been established, a Creep/Run selector switch may be activated by turning it to the Creep setting so that the programmed settings and tracking of the mandrel and carriage may be checked by the operator at a slow speed and after the Cycle Start button has been pushed, the mandrel and carriage move slowly through the programmed cycle. If by chance, the tracking is not correct, corrections can be made, such as by pressing "Advance" or "Retard" buttons to make the desired correction by relative adjustment of the positions of the carriage with respect to the mandrel under the computer control as mentioned above. After the tracking has been checked, and corrected, if necessary, the "Creep/Run" selector switch may be set for Run, to cause the carriage and mandrels to speed up to their programmed operating speeds.

The program entered in the computer will include instructions as to whether the cycle is to start at the head stock or tail stock end of the machine. After the carriage has moved to the end that is programmed for the start, the operations may begin.

When the machine is activated and all is in order and the carriage and mandrel are properly set in their respective starting positions, a cycle "Start" light on the control panel lights up. The operator then manually presses the very tacky free end of the rubber strip material to the starting end of the mandrel in a fixed position. The "Cycle Start" button is then pressed and the various drive means become energized to cause the mandrel to slowly begin its rotation and the carriage to start its travel. The drive means for both these elements will gradually speed up at a coordinated rate to a predetermined maximum speed to deliver the rubber strip material from its supply reels 200 on the carriage through the feed and guide rolls to be precisely wrapped spirally onto the rotating mandrel. Toward the end of that wrapping run, the computer program causes the machine to slow down and gradually come to a stop at a precise point when the carriage and mandrel reach the end of the rubber wrapping step that lays on the first ply A, shown in FIG. 23.

The speed of mandrel and carriage during acceleration and deceleration will follow an S-curve, Speed-Time profile to ensure a smooth variation in the speed of the heavy moving elements of the machine, to minimize tracking error between the mandrel and carriage due to inertia. The rotation of the mandrel is computer controlled during the run, creep and jog operations, all of which will be performed at preset speeds established by the computer program that is matched to the size of mandrel and other specifications for the hose building process.

At the point in the hose building procedure, when a completed layer of rubber strip material has been laid on the mandrel, the strip may then be severed so that the rubber strip supply means can be inactivated and put in a standby position. Usually a single layer of a rubber strip material is wrapped onto the mandrel but, depending upon the thickness of the rubber layer, more than one rubber strip could be applied before a wire wrapping operation is started.

After the programmed rubber layer has been applied to the mandrel, such as layer A shown in FIG. 23, the operator causes the carriage to be returned automatically at a relatively high speed to the starting end of the machine for the next wrapping sequence for applying the reenforcing wire layer by pressing a "Return" button. Upon the return of the carriage to the starting end, the operator then manually draws a sufficient number, say one hundred ends, of wire strands from the wire quide 166 at the end of the wire let-off means and attaches these wire ends to the mandrel with a strip of the tacky rubber tire making fabric material that adheres very tenaciously to the already applied rubber layer. When the wire ends are drawn taut and are attached to the mandrel, the "Cycle Start" button is pressed and then the mandrel and carriage, under the control of the computer, again begin their coordinated movements. Since the wire strands on the let-off means have been held taut between the creels 72 and wire guide means 166 by clamp 192, the wire clamp must now be released and as the mandrel begins rotation, the wire strands are pulled from the end guide means 166 of the wire let-off. The wire strands are each individually pulled by the rotation of the mandrel through the sheaves and guide from their respective creels on the carriage on which they are stored. The motion of each strand is retarded and guided as the strands are pulled through the various sheave means, with each wire being individually tensioned as it is laid on the mandrel with about a five pounds pull on each strand. As the speed of rotation of the mandrel increases, the longitudinal speed of the carriage movement along tracks 28 and 30 increases so that the strands of wires are laid onto the rubber layer at either a precise pitch or at a constant set angle, which is defined as the angle between a circumference line around the mandrel at the starting point and the instantaneous angle with respect thereto at which the material is deposited on the surface of the mandrel.

In a typical six inch concrete discharge hose, the one hundred strands of wire would be laid down with a fourteen inch pitch, that is, for each revolution of the mandrel, the carriage would progress fourteen inches lengthwise thereof under control of the computer, without any accumulation of error. In making a six inch diameter hose, in order to substantially cover the surface of the rubber layer with reenforcing wire of 0.030 diameter disposed at the proper pitch, it is necessary to make four wire wrapping passes of the carriage down the length of the mandrel, laying on wire with three passes of one hundred strands and one pass of ninety-three strands. After one pass with one hundred strands of wire has been completed, the clamp 192 is engaged on anvil 190, to hold the wire strands, the trailing ends of the wires strands are adhered to the mandrel with a tacky piece of tire fabric and then the wire strands are cut. The carriage is returned to the starting end of the wire winding process at a rate of approximately thirty feet per minute. When the carriage comes to rest at the other end of the mandrel, the operator then presses the "Phase Shift" button to rotatably advance the mandrel, under the control of the computer program, to the position for the next wire winding step. The recently severed wire ends are then adhered to the mandrel and the clamp 192 is released and the "Creep/Run" selector button is turned to Creep to start the second winding step with a slow rotation of the mandrel. The operator observes the initial tracking of the wire to make certain that a precise laydown of the wires, in near contact with the wires already on the mandrel, is taking place. Should there by any slight discrepancy in the winding, correction can be made in accordance with the established computer program, by pressing the proper "Advance" or "Retard" button, depending upon which correction is needed. When the winding is observed to be correct, the Creep/Run selector switch is turned to "Run" in order to start the winding process with the programmed correction entered in the computer. When the "Run" selector is turned, the mandrel rotation and carriage travel are smoothly accelerated to full seed to complete the second wire winding step. These wire winding operations are repeated for another winding step with one hundred ends of wire, normally without requiring any further precision tracking correction, then during a fourth pass of the carriage, ninety-three wire ends are manually selected to complete the covering of the mandrel surface with the specified wrapping of wire to form layer After the wire winding has been completed, a second winding of rubber strip material is started and completed by merely positioning the carriage at the selected starting end of the mandrel under the control of the computer for attachment of the rubber strip to the mandrel and upon pressing the "Cycle Start" button, layer C, shown in FIG. 23, is applied.

The precision control of the sequence of winding steps by the computer effects a proper winding of the several layers of rubber and wire on the mandrel. When the machine is stopped between winding cycles to attach the rubber strips or free ends of the wire strands to the mandrel, any manual adjustment of the wire let-off means or rubber guide means can be made.

After the specified number of plies have been spirally wound on the mandrel, in the example shown, five rubber layers, such as layers A, C, E, G and I, FIG. 23, have been applied and each of the four inside layers of rubber covered with a layer of wires B, D, F and H. The outer rubber layer I is finally wrapped with nylon cloth (not shown) to prepare the hose for vulcanization. The nylon tape is dispensed and correctly tensioned by utilizing an air operated clutch offering precise conrol of the pulling tension. By entering the required data into the computer, the pitch or angle of application of the nylon tape can be precisely controlled resulting in uniformly applied external pressure during vulcanization.

The various control buttons described above are built into the operator control panel 42 and are connected in an electrical circuit through the computer to operate conventional devices for energizing the driving means described herein to produce the laminated hose structure on the mandrel.

Various indicator lights may, of course, be provided to show the condition of or position of various elements. Since conventional computer means and electrical control devices for activating the motor drives connected to means adapted to produce the relative motions of the carriage and mandrel, as described above, are well known, they have not been shown herein.

The carriage motion can be controlled by a closed loop position control loop in the computer. The reference for this control loop will be a pulse generator driven off of the output of the mandrel speed reduction gear box 24. One revolution of the mandrel is used to represent one revolution of the tach. The carriage feedback will be from the absolute shaft encoder 39 driven from the output of the carriage drive gear box 36.

While the above specification describes the preferred form of this invention, it is possible that modifications thereof may occur to those skilled in the art that will fall within the scope of the attached claims.

I claim:

1. A machine for building a steel wire reenforced laminated rubber hose in a controlled cycle by depositing the several separate layers of rubber and wires to be laminated together on a generally cylindrical mandrel in a condition to be cured and stripped therefrom, comprising a means to support the mandrel to rotate about its longitudinal axis, variable speed drive means to rotate said mandrel, carriage means reciprocably movable in a path parallel to the axis of said mandrel, drive means to simultaneously reciprocate said carriage means in said path while said mandrel rotates, a first supply means of said carriage for delivering a rubber material in strip form in a controlled sequence from the carriage to the mandrel to be wrapped in a spiral so that each strip forms a layer around the exposed outer surface on the mandrel, other supply means for delivering multiple strands of wire in an alternate sequence of wrapping, said other supply means including let-off means having a plurality of individually rotatable sheaves positioned on said let-off means so that each sheave cooperates with an individual wire, and means for braking the rotational motion of each sheave to produce tension in each of said wire strands passing through the let-off means, means to place the individual strands of wire under tension as they are being positioned in a spiral layer around the exposed outer surface on the mandrel, and means for precisely coordinating the relative rotation of said mandrel and the reciprocation of said carriage whereby the multiple strands of rubber and wire are laid in an exact pattern on the surface of the mandrel to form their respective layers that cover the entire surface thereof, said means including a computer system which monitors rotation of said mandrel and which controls said drive means for said reciprocating carriage so that said mandrel and carriage move in a predetermined ratio without any accumulation of error, said means for precisely coordinating the relative rotation of said mandrel and the reciprocation of the carriage also including means arranged to precisely rotate the mandrel through a portion of one revolution at the start of each of said steps of wire wrapping whereby to produce the precise laydown of all of the wires over the entire surface on which the strands of wire are wrapped.

2. A machine as in claim 1 wherein the computer is programmed to exert a pitch mode of spiral application of said rubber strip material and wire strands.

3. A machine as in claim 1 wherein the computer is programmed to exert an angle mode of spiral application of said rubber strip material and wire strands.

4. A machine as in claim 2 wherein the diameter of said mandrel increases as each layer of rubber strip and wire strands is deposited thereon and said computer is programmed according to the formulas $l_k = (\Delta D \pi / \Delta \tan \theta)$ where $l_k$ is a constant lead, $\Delta D$ is the change in diameter of the mandrel and $\Delta \tan \theta$ is change in the angle of applying the rubber strip and wire strand as the diameter changes.

5. A machine as in claim 3 wherein the diameter of said mandrel increases as each layer of rubber strip material and wire strands is deposited thereon and said computer is programmed according to the formula $(\tan \theta) \text{hd } k = (\Delta D / \Delta L)$ where $\Delta L$ is the change in lead, $\Delta D$ is the change in diameter and $(\tan \theta)_k$ is a constant angle.

6. A machine for building a steel wire reenforced laminated rubber hose in a controlled cycle by depositing the several separate layers of rubber and wires to be laminated together on a generally cylindrical mandrel in a condition to be cured and stripped therefrom, comprising: means to support the mandrel to rotate about its longitudinal axis; variable speed drive means to rotate said mandrel; carriage means reciprocably movable in a path parallel to the axis of said mandrel; drive means to simultaneously reciprocate said carriage means in said path while said mandrel rotates; first supply means on said carriage for delivering a rubber material in strip form in a controlled sequence from the carriage to the mandrel to be wrapped in a spiral so that each strip forms a layer around the exposed outer surface on the mandrel; other supply means for delivering multiple strands of wires in an alternate sequence of wrapping, said other supply means including let-off means having a plurality of individually rotatable sheaves positioned on said let-off means so that each sheave cooperates with an individual wire, and wire strand guide means between said mandrel and said rotatable sheaves for directing the strands onto the surface of the mandrel and means for braking the rotational motion of each sheave to produce tension in each of said wire strands passing through the let-off means, means to place the individual strands of wire under tension as they are being positioned in a spiral layer around the exposed outer surface on the mandrel, said means including wire clamp means positioned between said sheaves and said guide means to hold the tension in said wires when said carriage is moving between the steps of said wire wrapping sequences, said clamp means including an anvil and a roller having a resilient surface disposed on the opposite sides respectively of the wire strands flowing from said sheaves to said guide means, and power means operative to press said roller against said anvil while said carriage moves between the steps of said wire wrapping sequences to clamp the wire strands on said anvil and means for precisely coordinating the relative rotation of said mandrel and the reciprocation of said carriage whereby the multiple strands of rubber and wire are laid in an exact pattern on the surface of the mandrel to form their respective layers that cover the entire surface thereof.

7. A hose-building machine comprising: a rotatable mandrel; drive means for rotating the mandrel about its axis; said mandrel drive means including a first electric motor and a speed reduction unit; a carriage mounted for linear movement in a path parallel to said mandrel; wire supply means mounted on the carriage for movement therewith, said supply means including a plurality of wire supply creels and wire guide sheaves for guiding wire unwound from the creels to the mandrel; means for reciprocally driving the carriage along said path, said drive means including a second electric motor and a speed reduction unit; and control means for operating said first and second electric motors in a predetermined ratio, said control means including means arranged to precisely rotate the mandrel through a portion of one revolution at the start of each of said steps of wire wrapping whereby to produce the precise laydown of all of the wires over the entire surface on which the strands of wire are wrapped, and said control means further including a device for generating a signal in response to the speed of the carriage, a device for generating a signal in response to the speed of the mandrel and a computer connected to receive the signals from said signal devices and to control said motors.

8. A machine for building a steel wire reenforced laminated rubber hose in a controlled cycle by depositing the several separate layers of rubber and wires to be laminated together on a generally cylindrical mandrel in a condition to be cured and stripped therefrom, comprising means to support the mandrel to rotate about its longitudinal axis; variable speed drive means to rotate said mandrel; carriage means reciprocably movable in a path parallel to the axis of said mandrel; drive means to simultaneously reciprocate said carriage means in said path while said mandrel rotates; a first supply means on said carriage for delivering a rubber material in strip form in a controlled sequence from the carriage to the mandrel to be wrapped in a spiral so that each strip forms a layer around the exposed outer surface on the mandrel; other supply means for delivering multiple strands of wires in an alternate sequence of wrapping, said other supply means including let-off means having a plurality of individually rotatable sheaves positioned on said let-off means so that each sheave cooperates with an individual wire, and means for braking the rotational motion of each sheave to produce tension in each of said wire strands passing through the let-off means; said let-off means being supported on a vertical support fixed to a base carried on said carriage, said base including a rotary table for carrying said vertical support and a bearing element fixed on said carriage for supporting the table, and means to hold said table fixed relative to said bearing during said cycle, said table including a peripheral flange rotatable in a generally horizontal plane, caliper disk brake means for engaging said flange, said caliper disk brake means being fixed to said carriage and operable to release the flange to permit the table to be turned to a new position and means that may then be activated to engage the disk brake means to hold said table in said new relatively fixed position; means to place the individual strands of wire under tension as they are being positioned in a spiral layer around the exposed outer surface on the mandrel; and means for precisely coordinating the relative rotation of said mandrel and the reciprocation of said carriage whereby the multiple strange of rubber and wire are laid in an exact pattern on the surface of the mandrel to form their respective layers that cover the entire surface thereof, said means including a computer system which monitors rotation of said mandrel and which controls said drive means for said reciprocating carriage so that said mandrel and carriage move in a predetermined ratio without any accumulation of error.

9. A machine as in claim 8 wherein said let-off means is movable about 3 axes for setting it in a fixed position for each wire wrapping sequence.

10. A machine for building a steel wire reenforced laminated rubber hose in a controlled cycle by depositing the several separate layers of rubber and wires to be laminated together on a generally cylindrical mandrel in a condition to be cured and stripped therefrom, comprising means to support the mandrel to rotate about its longitudinal axis; variable speed drive means to rotate said mandrel; carriage means reciprocably movable in a path parallel to the axis of said mandrel; drive means to simultaneously reciprocate said carriage means in said path while said mandrel rotates; a first supply means on said carriage for delivering a rubber material in strip form in a controlled sequence from the carriage to the mandrel to be wrapped in a spiral so that each strip forms a layer around the exposed outer surface on the mandrel; other supply means for delivering multiple strands of wires in an alternate sequence of wrapping, said other supply means including let-off means having a plurality of individually rotatable sheaves positioned on said let-off means so that each sheave cooperates with an individual wire, and means for braking the rotational motion of each sheave to produce tension in each of said wire strands passing through the let-off means; said let-off means being supported on a vertical support fixed to a base carried on said carriage, said base including a rotary table for carrying said vertical support and a bearing element fixed on said carriage for supporting the table, and means to hold said table fixed relative to said bearing during said cycle, said let-off means including a pivotally mounted arm, said arm rotating about a horizontal azis carried on said vertical support, said arm having a longitudinal axis extending generally laterally from said axis support, and said arm having guide means thereon to direct the wire strands onto the rotating mandrel; means to place the individual strands of wire under tension as they are being positioned in a spiral layer around the exposed outer surface on the mandrel; and means for precisely coordinating the relative rotation of said mandrel and the reciprocation of said carriage whereby the multiple strands of rubber and wire are laid in an exact pattern on the surface of the mandrel to form their respective layers that cover the entire surface thereof, said means including a computer system which monitors rotation of said mandrel and which controls said drive means for said reciprocating carriage so that said mandrel and carriage move in a predetermined ratio without any accumulation of error.

11. A machine as in claim 10 wherein selectively operative power means are provided to control the position of said arm about its pivot axis relative to said vertical support, and means to hold said arm fixed in a desired controlled position relative to said vertical support during a wrapping cycle.

12. A machine as in claim 10 wherein said guide means includes means for engaging the individual wire strands being wrapped onto the mandrel, said guide means being mounted on said axis to oscillate from one fixed position to another about said axis, and means to hold said guide means in one of said fixed positions during a wrapping cycle.

13. A machine as in claim 11 wherein said guide means includes means for engaging the individual wire strands being wrapped onto the mandrel, said guide means being adjustably mounted on said other end of said arm to oscillate about said longitudinal axis of said arm.

* * * * *